Aug. 21, 1923.
M. HITZ
DIRIGIBLE HEADLIGHT
Filed June 1, 1922
1,465,847
2 Sheets-Sheet 1
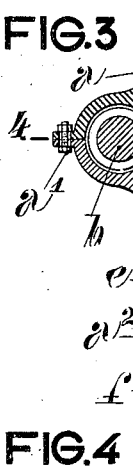
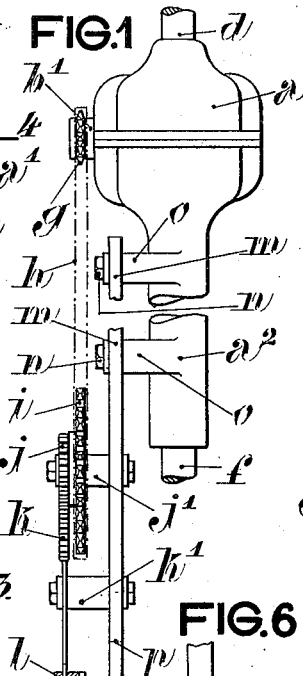
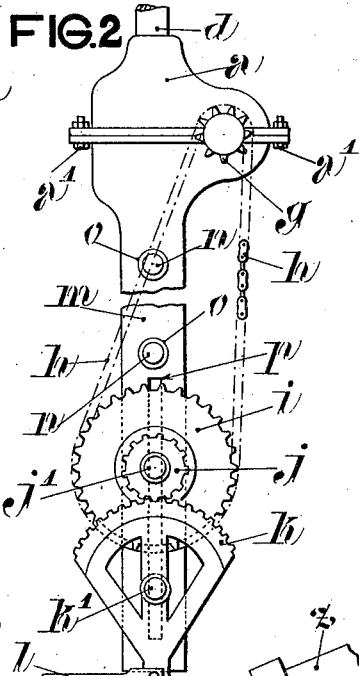
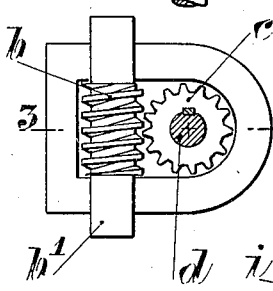
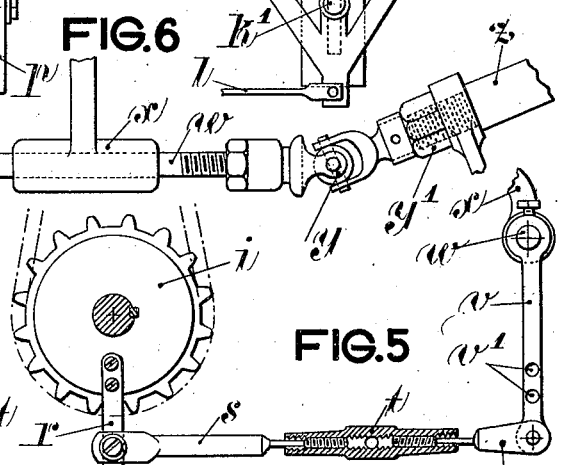
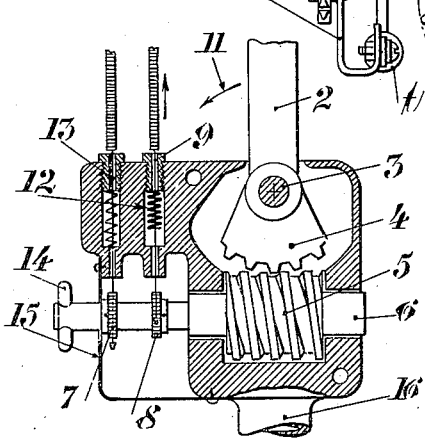
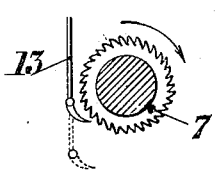
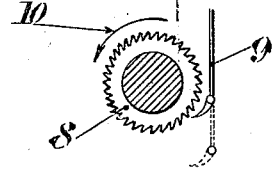
Witnesses
Guillaume Dioche
Antoine Bocon
Inventor
Maurice Hitz Aug. 21, 1923.
M. HITZ
1,465,847
DIRIGIBLE HEADLIGHT
Filed June 1, 1922
2 Sheets-Sheet 2
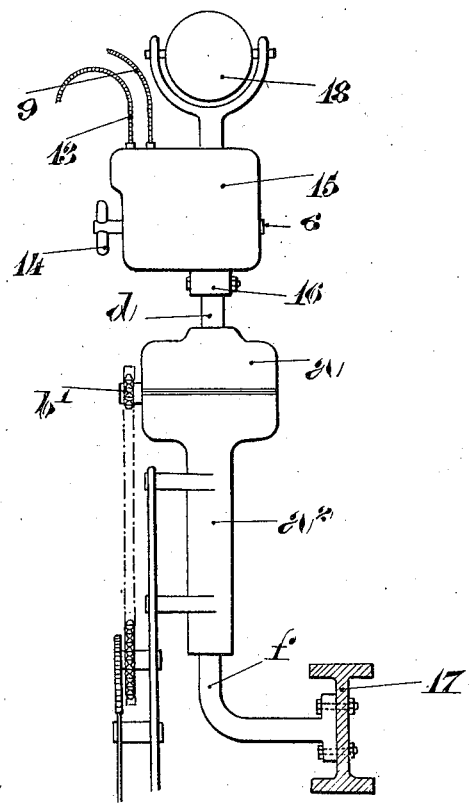
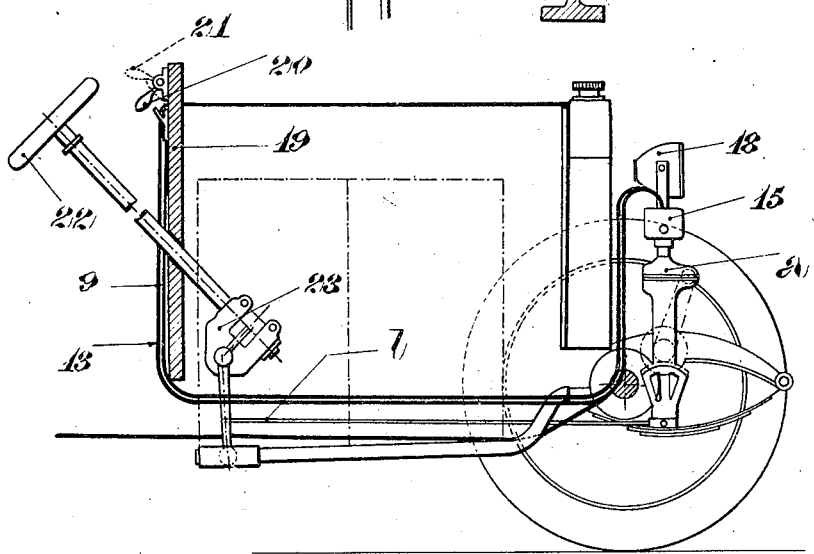

Patented Aug. 21, 1923.

1,465,847

UNITED STATES PATENT OFFICE.

MAURICE HITZ, OF BELFORT, FRANCE, ASSIGNOR TO JOSEPH HITZ, OF LYON, FRANCE.

DIRIGIBLE HEADLIGHT.

Application filed June 1, 1922. Serial No. 565,195.

*To all whom it may concern:*

Be it known that I, MAURICE HITZ, residing at Belfort, France, a citizen of the French Republic, have invented certain new and useful Improvements in Dirigible Headlights, of which the following is a specification.

The invention relates to means whereby the lamps of automobile vehicles can be deflected in accordance with curves of the road, and also vertically.

The invention is illustrated in the accompanying drawing, in which Figs. 1 to 4 show one embodiment thereof, comprising mechanism for imparting horizontal deflection.

Figs. 1 and 2 are a front view and a side view, respectively, with parts of the mechanism broken away.

Fig. 3 is a vertical section on the line 3—3 of Fig. 4.

Fig. 4 is a horizontal section on the line 4—4 of Fig. 3.

Figs. 5 and 6 are a front view and a side view respectively, illustrating a modification, more particularly intended for cars having steering mechanism of the Ford type.

Fig. 7 is a vertical section of mechanism for vertical deflection of the lamps,

Figs. 8 and 9 show details thereof to an enlarged scale.

Fig. 10 is a front elevational view of a lamp with means for moving it about vertical and horizontal axes.

Fig. 11 is a diagrammatic side view of the same on a smaller scale illustrating also the attachment to the steering pillar and to manual controls on the dash board of the vehicle.

$a$ designates a bronze casing made in two parts connected by bolts $a^1$ and enclosing a worm $b$ gearing with a worm wheel $c$ keyed to a spindle $d$ to the upper end of which is fixed the usual lamp holder or bracket.

This spindle rests on a ball $e$, which separates it from a spidle $f$ fixed inside a tubular downward extension $a^2$ of the casing, and also fixed to the frame of the car.

The shank $b^1$ of the worm $b$ carries, outside the casing $a$, a pinion $g$, connected by a chain $h$ to a sprocket wheel $i$, to the axle $j^1$ of which is keyed a pinion $j$. The latter meshes with a toothed sector $k$, pivoted at $k^1$ and connected by a rod $l$ to the steering mechanism of the car.

The pinions $i$ and $j$ and the sector $k$ are mounted on a rod $m$ secured by nuts $n$ to two bosses $o$ on the tubular part $a^2$. This rod has a longitudinal slot, $p$, which allows of adjusting the position of the axle $j^1$ and pivot $k^1$ and regulating the tension of the chain $h$.

It will be understood that any deflection given to the wheels for steering purposes is transmitted, by the rod $l$ to the sector $k$, which by rocking in one or the other direction produces a corresponding rotation of the wheels $j$, $i$, $g$, and consequently of the worm $b$, the worm wheel $c$ and the lamp supporting spindle $d$.

In the modification shown in Figs. 5 and 6 the sprocket wheel $i^1$ corresponding to the sprocket wheel $i$ in Fig. 2, has a crank arm $r$ to which is connected one end of a connecting rod $s$, adjustable by means of a turnbuckle $t$. The other end $u$ of this rod is connected to another crank $v$ on an axle $w$. The latter is mounted in a sleeve $x$ secured to the car, and to it is fixed one of the members of a universal or Cardan joint $y$, whose other member is secured to the lower end of the steering pillar or bar $z$. For this purpose, this part of the universal joint is integral with a nut $y^1$ which is screwed on in place of the nut usually provided in these cars.

Any other convenient method may be used whereby rotary movement is transmitted from the member $z$ to the axle $w$.

The crank arm $v$ has a series of holes $v^1$ for adjustable connection of the rod $s$, in order to regulate the deflection imparted to the lamps.

In order to deflect the beam vertically there may be provided between the lamp and the device illustrated in Figs. 1 to 4 a second casing enclosing mechanism for that purpose, actuatable by direct manual control or by intermediate mechanism from a distance. This additional deflecting mechanism may be used alone or simultaneously with the mechanism for horizontal deflection.

Means for vertical deflection are shown in Figs. 7 to 9. The lamp is mounted on a rod 2, which can be rocked on a pivot 3 by a toothed sector 4 engaged with a worm 5 on an axle 6. To the latter are fixed two ratchet wheels 7 and 8, with teeth oppositely directed. By pulling a chain or cable 9, which carries a pawl, the wheel 8 is rotated in the direction of the arrow 10 (Fig. 9). The lamp is then dipped as indicated by the arrow 11 (Fig. 7). When the pull is relaxed a spring 12 restores the pawl to the position of rest indicated by broken lines in Fig. 9. By pulling a cable 13 the axle 6 is rotated in the opposite direction.

In case of need, vertical deflection can be effected by turning the axle 6 by means of a key 14 (Fig. 7).

A disconnectible part 15 of the casing facilitates access to the ratchet wheels.

The casing has a socket 16 which fits on to the spindle $d$ (Figs. 1 to 3) and can be fastened to the same by any convenient means.

It will be understood that the two deflecting devices can also be combined so as to form a single lamp support adjustable in all directions.

In the assembled form shown in Figs. 10 and 11, 17 indicates one of the drum irons of the chassis frame, $f$ an angle bracket secured thereto and carrying the lower portion $a^2$ of the apparatus. 22 is the steering wheel, 23 the box enclosing the steering gear at the base of the steering pillar. 20 and 21 indicate two hand levers controlling the cables 13 and 9.

What I claim as my invention and desire to secure by Letters Patent of the United States is:—

1. The combination of a supporting stem, a casing divided transversely and having a central longitudinal bore adapted to receive said stem, a spindle adapted to be inserted in said bore and to have bearing on the end of said stem, a chamber in said casing where it is transversely divided, a worm wheel on said spindle in said chamber, a worm engaging with said worm wheel, a shaft for said worm, means exteriorly of the casing for revolving said worm, said means comprising a vibratory toothed segment, means for connecting said segment to the steering column of an automobile, a further casing fixedly attached to said spindle, a lamp bracket carried by said further casing and movable in a vertical plane about a transverse axis, and means operatable from near the steering column for moving said lamp bracket.

2. The combination of a supporting stem, a casing divided transversely and having a central longitudinal bore adapted to receive said stem, a spindle adapted to be inserted in said bore and to have bearing on the end of said stem, means exteriorly of the casing for revolving said spindle, said means being connected to the steering column of an automobile, a further casing fixedly attached to said spindle, a lamp bracket movable in a vertical plane about a transverse axis, means in said last mentioned casing for moving said lamp bracket, these means including a worm wheel and worm, and means operatable from near the steering column for operating said worm at will.

3. The combination of a supporting stem, a casing divided transversely and having a central longitudinal bore adapted to receive said stem, a spindle adapted to be inserted in said bore and to have bearing on the end of said stem, means exteriorly of the casing for revolving said spindle, said means comprising a vibratory toothed segment, means for connecting said segment to the steering column of an automobile, a further casing fixedly attached to said spindle, a lamp bracket movable in a vertical plane about a transverse axis, means in said last mentioned casing for moving said lamp bracket, these means including a worm wheel and worm, two oppositely disposed ratchet wheels for revolving said worm, dogs normally disposed out of contact with said ratchet wheels respectively and separate means operatable from near the steering column for bringing said dogs severally into contact with and for causing them to revolve said worm.

4. The combination of a supporting stem, a casing divided transversely and having a central longitudinal bore adapted to receive said stem, a spindle adapted to be inserted in said bore and to have bearing on the end of said stem, a chamber in said casing where it is transversely divided, a worm wheel on said spindle in said chamber, a worm engaging with said worm wheel, a shaft for said worm, means exteriorly of the casing for revolving said worm, said means comprising a vibratory toothed segment, means for connecting said segment to the steering column of an automobile, a further casing fixedly attached to said spindle, a lamp bracket movable in a vertical plane about a transverse axis, means in said last mentioned casing for moving said lamp bracket, these means including a worm wheel and worm, two oppositely disposed ratchet wheels for revolving said worm, dogs normally disposed out of contact with said ratchet wheels respectively and separate means operatable from near the steering column for bringing said dogs severally into contact with and for causing them to revolve said worm.

In witness whereof I have signed this specification in the presence of two witnesses.

MAURICE HITZ.

Witnesses:
JEAN GERMAIN,
JULIAN KEMBLE SWEDBERG.